UNITED STATES PATENT OFFICE.

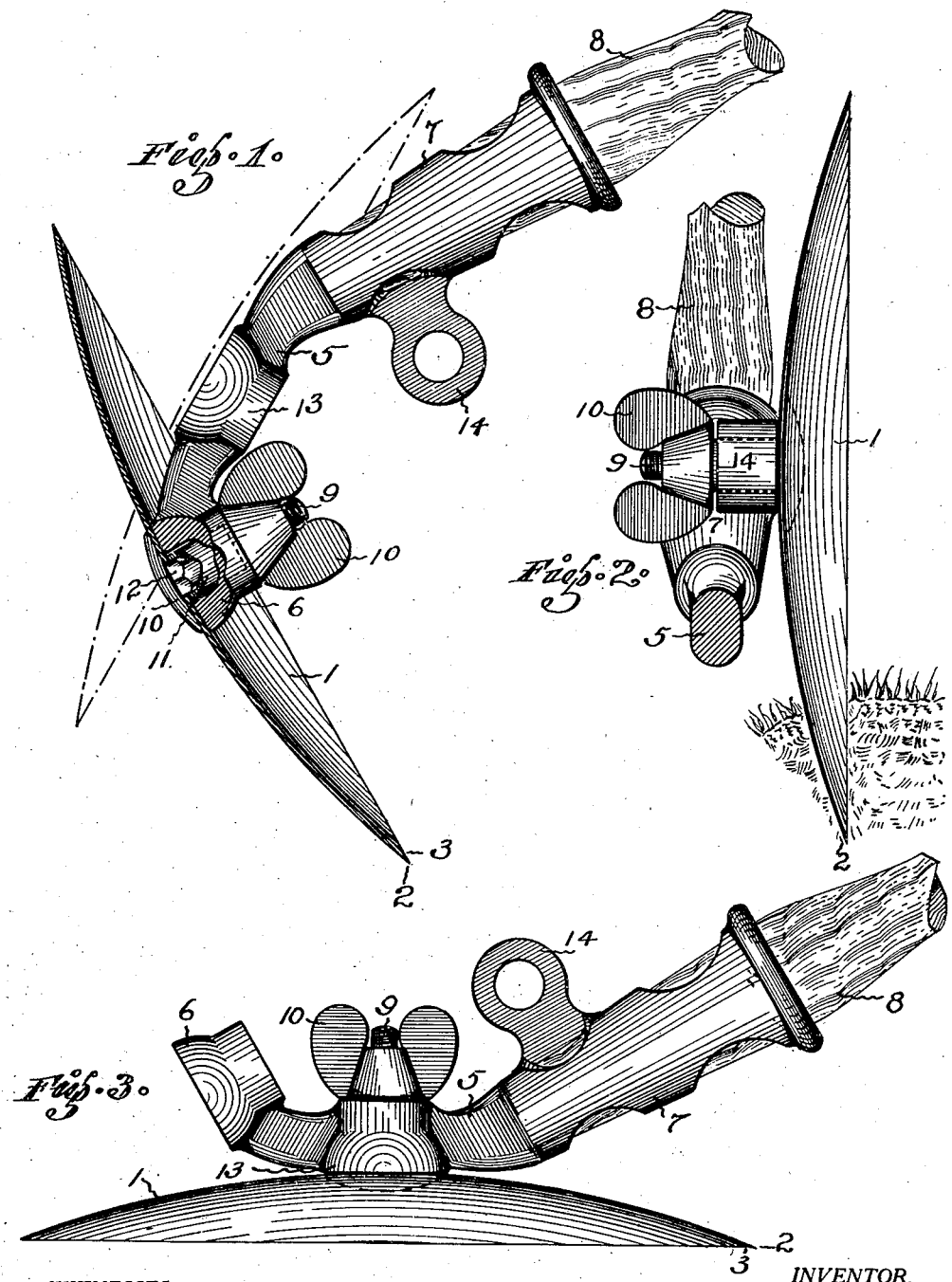

BALDWIN VALE, OF ALAMEDA, CALIFORNIA.

IMPLEMENT OF AGRICULTURE.

1,110,244. Specification of Letters Patent. Patented Sept. 8, 1914.

Application filed March 17, 1913. Serial No. 755,017.

*To all whom it may concern:*

Be it known that I, BALDWIN VALE, a citizen of the United States, and a resident of the city of Alameda, county of Alameda, and State of California, have invented new and useful Improvements in Implements of Agriculture, of which the following is a specification.

This invention relates to improvements in implements of agriculture and more particularly to garden tools.

Among the many objects of this invention are: to provide a hand tool for cultivating the soil, combining simplicity and strength, that is cheap to manufacture, symmetrical and commercially attractive in appearance, and has a wide range of usefulness.

Other objects will be manifest to those skilled in this art in the practice of this invention.

The invention possesses other advantageous features, which, with the foregoing, will be set forth at length in the following description, where I shall outline in full that form of the invention selected for illustration in the drawings accompanying and forming part of the present specification. The novelty of the invention will be included in the claims succeeding said description. From this, it will be apparent that I do not restrict myself to the showing made by said drawings and description, as I may adopt many variations within the scope of my invention as expressed in said claims.

In the drawings: Figure 1 is a side elevation of a digging hoe constructed in accordance with this invention. The concave disk forming the hoe blade is shown in vertical cross section, certain of the parts being broken away to disclose underlying parts. Fig. 2 is an end elevation of the same parts, assembled for operation as a colter or turf cutter for the edges of lawns, and the like. The end of the disk mounting shank is broken away better to disclose the parts lying behind. Fig. 3 is a side elevation of the same parts assembled for operation as a scuffle hoe, for cutting the roots of weeds, etc., above or below the surface of the ground.

In detail, the construction of the tool consists of the flat or concave disk 1, preferably provided with a central opening and a circumferential cutting edge 2. The cheapest and most desirable way of forming this edge is to grind the disk on its truncate line forming the annular plane 3.

The mounting for the disk consists of the shank 5, provided with the enlargement 6, adapted to be bolted, riveted, or otherwise secured to the disk. The shank terminates in the socket 7 to receive the helve or handle 8. This socket may be substituted by sharpening the shank and driving it into the handle as circumstances require.

Better to disclose the possibilities of this invention, I have chosen that form of combination shank shown, upon which the disk can be mounted in various positions at will. This combination, while very desirable, is more expensive in that it calls for the bolt 9, the thumb nut 10, and the sleeve 11. The hole in the disk is preferably square to engage the square shank 12 of the bolt, to prevent its turning in screwing on the thumb-nut.

When used in the position illustrated in Figs. 1 and 3, the sleeve 11 may be shorter than the thickness of the lugs 6 and 13, to hold the disk rigidly to the shank; while the thickness of the lug 14 is less than the length of the sleeve 11, which causes the bolt and the thumb-nut to clamp the sleeve and the disk rigidly together, the sleeve forming a spindle, rotatable within the lug 14 which permits the disk to rotate freely for a variety of obvious uses.

As a chopping hoe, (see Fig. 1) this invention has many advantages over the common flat bladed hoe, primarily greater strength and rigidity, permitting a much more effective cutting or digging stroke. This is due to the strength of the archlike concavity of the disk, the plane of the edge being substantially at right angles to the axis of the handle, combined with the rigidity of the disk and the fact that, while the effective cutting edge of the disk is greater than that of a straight blade, the line of cleavage is wedge-like and shearing in its action. Therefore, it is possible to drive the concave disk into hard ground from which a flat hoe blade would simply rebound.

Another advantage of this disk hoe is that it can be used for cultivating between close rows of growing plants with less danger of injury to the roots. The apex of the cutting edge being centered under the line of the handle, a very effective stroke can be given in attacking a single root. It is possible even to cut and remove tree roots of considerable size far beyond the capacity of any mere hoe with a flat cutting blade.

Fig. 5 illustrates a scuffle hoe having a concave disk blade. The shearing action of a round disk is particularly advantageous for this use in connection with the increased strength and rigidity due to the concavity The concavity presents the cutting edge at an angle to the plane of operation which obviously makes the disk self sharpening.

The rolling colter illustrated in Fig. 2 is very useful in trimming the edges of lawns particularly around the fanciful outlines of landscape gardening, and in forming seed furrows for planting, etc.

The dotted line construction in Fig. 1 illustrates another possible position of the disk, useful in "hilling up" soil around the roots of plants; it is also useful in smoothing and tamping the surface, taking the place of a small shovel or spade. The digging hoe assemblage is very useful in removing dirt from post holes, and also as a tamper. Other uses and advantages are sufficiently manifest.

While I have shown and described the combinative construction of shank and assemblage, I do not wish to be understood as thereby limiting this invention and the following claims thereto. A concave or flat cutting disk may be attached to a handle by various means, fixed or adjustable, and at various angles without departing from the spirit of this invention as defined by the claims herein.

I claim:

1. An agricultural implement of the character described comprising a shank provided with a plurality of sockets angularly disposed with respect to each other, and all of them out of alinement with the axis of said shank, a concavo convex disk, and means for securing said disk at its center to either of said sockets.

2. An agricultural implement of the character described comprising a shank the body of which is deflected in a continuous line to form a plurality of angularly disposed portions each provided with a socket, a concavo-convex disk, and means for securing said disk at its center to either of said sockets.

3. An agricultural implement of the character described comprising a shank having a socket in one end, the other end being formed at an angle to said socket and also having a socket therein, and an angularly disposed member between said sockets and provided with a third socket, a concavo-convex disk, and means for securing said disk at its center to either of the sockets of said angularly disposed portions.

4. An agricultural implement of the character described comprising a shank provided with a plurality of sockets angularly disposed with respect to each other, and a third socket arranged in a plane at right angles to the plane of the first mentioned sockets, a disk, and means for securing said disk to either of said sockets.

5. An agricultural implement of the character described comprising a concavo-convex disk, a shank attached to the concave side of said disk, a handle attached to said shank, said handle being offset from the center of said disk, and substantially at a right angle to the cutting edge thereof.

6. An agricultural implement of the character described comprising a concavo-convex disk, a shank attached to the concave side of the disk at the center of the latter, and a handle attached to said shank, said handle being offset substantially at right angles to the cutting edge of the disk.

In testimony whereof, I have hereunto set my hand at San Francisco, Cal., this 8th day of March 1913.

BALDWIN VALE.

In presence of—
EMILY B. VALE,
P. S. PIDWELL.